United States Patent
Plottnik et al.

(10) Patent No.: US 6,281,455 B1
(45) Date of Patent: Aug. 28, 2001

(54) FORCE-RESPONSIVE DETECTORS AND SYSTEMS

(75) Inventors: Reimund Plottnik, Viersen; Hans Wilde, Ennepetal, both of (DE)

(73) Assignee: Draftex Industries Limited, Eroinburgh (GB)

( * ) Notice: Subject to any disclaimer, the term of this patent is extended or adjusted under 35 U.S.C. 154(b) by 0 days.

(21) Appl. No.: 09/445,704

(22) PCT Filed: Aug. 12, 1998

(86) PCT No.: PCT/GB98/02424

§ 371 Date: Mar. 23, 2000

§ 102(e) Date: Mar. 23, 2000

(87) PCT Pub. No.: WO99/09570

PCT Pub. Date: Feb. 25, 1999

(30) Foreign Application Priority Data

| Aug. 14, 1997 | (GB) | 9717280 |
| Sep. 30, 1997 | (GB) | 9720808 |

(51) Int. Cl.[7] .................................................. H01H 3/16
(52) U.S. Cl. .................................... 200/61.44; 200/61.73
(58) Field of Search ........... 49/26–28; 200/61.41–61.44, 200/61.62, 61.7, 61.71, 61.73, 61.74, 61.76, 61.78, 61.81, 61.82, 511, 85 R, 86 R

(56) References Cited

U.S. PATENT DOCUMENTS

| 3,270,160 | 8/1966 | Koenig | 200/86 |
| 4,360,716 | 11/1982 | Fiorella | 200/5 A |
| 4,525,606 | * 6/1985 | Sado | 200/5 A |
| 4,532,388 | 7/1985 | Sackmann et al. | 200/61.43 |
| 5,118,910 | * 6/1992 | Duhon et al. | 200/86 R |
| 5,374,796 | 12/1994 | Plummer | 200/512 |
| 5,459,962 | * 10/1995 | Bonne et al. | 49/28 |
| 5,623,760 | * 4/1997 | Newham | 29/622 |
| 5,834,719 | * 11/1998 | Kaji et al. | 200/61.44 |

FOREIGN PATENT DOCUMENTS

| 42 26 869 | 2/1993 | (DE) | B60R/21/32 |
| 630450 | 10/1949 | (GB) . | |
| 753018 | 7/1956 | (GB) . | |
| 759237 | 10/1956 | (GB) . | |
| 1 209 564 | 10/1970 | (GB) | H01H/13/04 |
| 2 261 115 | 5/1993 | (GB) | H01H/3/14 |
| 2 300 444 | 11/1996 | (GB) | B60J/1/17 |
| 2 314 378 | 12/1997 | (GB) | E05F/15/16 |
| 90/10204 | 9/1990 | (WO) | G01L/1/00 |

* cited by examiner

Primary Examiner—Michael Friedhofer
(74) Attorney, Agent, or Firm—Leydig, Voit & Mayer, Ltd.

(57) ABSTRACT

A force-responsive sensor comprises upper and lower cover layers, one superimposed on the other. The underside of the upper layer carries a first conductive layer which is electrically insulated from a second conductive layer carried by the upper surface of the lower cover sheet by a series of electrically insulating spacers placed along the length of the sensor with longitudinally spaced gaps between them, each spacer extending over substantially the full width of the sensor and being obliquely inclined to the longitudinal direction of the sensor.

9 Claims, 4 Drawing Sheets

FORCE-RESPONSIVE DETECTORS AND SYSTEMS

BACKGROUND OF THE INVENTION

The invention relates to force-responsive sensors and systems. Sensors and systems embodying the invention, and to be described in more detail below by way of example only, are for use in motor vehicles for detecting the presence of an obstruction in a window opening closable by a motorised window pane. However, such sensors and systems may be used in many other applications.

BRIEF SUMMARY OF THE INVENTION

According to the invention, there is provided a force-responsive longitudinally extending sensor, comprising first longitudinally extending electrically conductive means, second electrically conductive means extending at least partially along the first means, electrically insulating means positioned between and spacing the first means from longitudinally distributed parts of the second means, the remaining parts of the second means on each longitudinal side of the said longitudinally distributed parts normally being resiliently held spaced apart from the first means but being able to be flexed against the resilience into contact with the first means in response to an applied force.

BRIEF DESCRIPTION OF THE DRAWINGS

Force-responsive sensors and systems embodying the invention, and window safety systems embodying the invention and for use in motor vehicles, will now be described, by way of example only, with reference to the accompanying diagrammatic drawings in which.

DETAILED DESCRIPTION OF THE INVENTION

Figure 1:
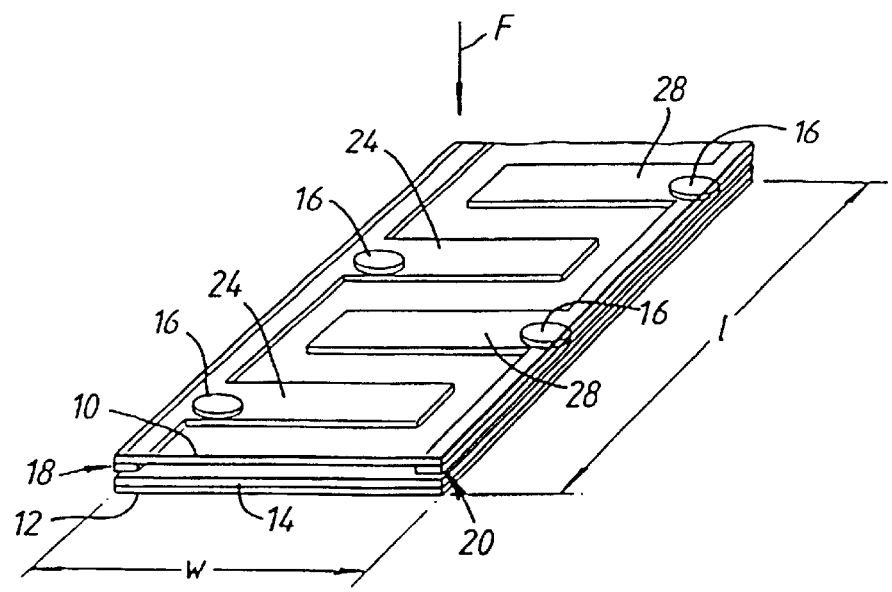
FIG. 1 is a perspective view of one of the sensors.
Figure 2:
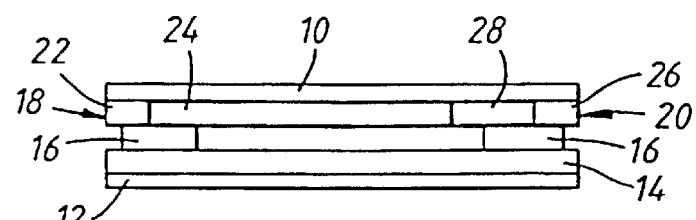
FIG. 2 is an enlarged end view of the sensor of FIG. 1.
Figure 3:
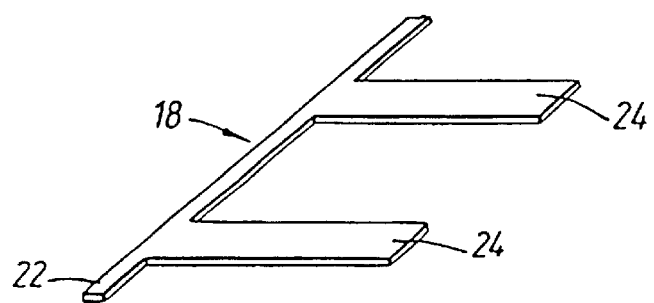
FIG. 3 is a plan view of an electrically conductive member used in the sensor of FIGS. 1 and 2.

FIGS. 1, 2 and 3 show one of the sensors. It is of indeterminate length l and predetermined width w. In response to a force applied to it at individual points along its surface and in a direction perpendicular, or at least transverse, to the plane lw, it produces an electrically detectable signal.

As shown in FIGS. 1 and 2, the sensor has a rectangular cover layer 10 which is made of flexible and resilient electrically insulating material and extends over the entire upper surface (as viewed in FIGS. 1 and 2) of the sensor. In FIG. 1 the cover layer 10 is shown as being transparent in order to reveal the construction of the sensor. Normally, however, it would not be transparent.

A similar cover layer 12 is positioned along the under surface of the sensor (as viewed in FIGS. 1 and 2); the layer 12 is also electrically non-conductive. An electrically conductive layer 14 of rectangular form is mounted on the cover layer 12 and covers substantially its whole length and width. The layer 14 is advantageously an electrically conductive film which may be formed by a printed circuit technique on the layer 12. Mounted at intervals on and along the conductive layer 14 are electrically insulating spacers 16 which again may be formed by a printed circuit technique.

Two separate inter-digitated electrically conductive members 18 and 20 are formed on the underside of the layer 10. They are advantageously electrically conductive films which may be formed by a printed circuit technique on the layer 10. The shape of the member 18 is shown more clearly in FIG. 3. As shown, it comprises an edge portion 22 from which fingers 24 integrally extend. Member 20 is similarly shaped, comprising an edge portion 26 with fingers 28. As shown in FIG. 1, members 18 and 20 are arranged so that each finger 24 of the member 18 is positioned between two fingers 28 of the member 20.

The spacers 16, in combination with the resilience of the cover layer 10 which carries the members 18 and 20, ensure that there is no normal contact between either of the members 18 and 20 and the conductive layer 14.

In operation, a force applied to the sensor in the direction of the arrow F will flex the cover layer 10 and thus press one or more of the fingers 24,28 into electrical contact with the underlying conductive layer 14. An electrical circuit is therefore completed and this can be detected in any conventional way.

Clearly, if the force F is applied over a very small area which is positioned between, and less than the area between, two adjacent fingers 24,28, it is possible that no electrical signal will be produced. In practice, therefore, the spacing between the fingers is selected to be sufficiently small to produce the required sensitivity of detection.

In FIG. 1, the spacers 16 are shown in full line to aid understanding of the drawing. They would of course not in practice be visible.

The spacers 16 are shown in FIG. 1 as being of thin circular disc-like form. However, they can be of any suitable shape and can be positioned in any way which ensures that the members 18,20 normally are separated from the conductive layer 14 and so that the members 18,20 only make contact with the layer 14 in response to an applied force F.

It will be noted from FIGS. 1,2 and 3 that the spacers 16 are shaped and positioned so that the width of the area of the sensor which is responsive to an applied force F to be detected is only very slightly less than the overall width w of the sensor. It would of course be possible to insulate the members 18 and 20 from the conductive layer 14 by electrically insulating strips positioned between the edge portion 22 and the layer 14 and positioned between the edge portion 26 and the layer 14. However, in order to provide effective separation and electrical insulation, it would be necessary with such an arrangement to increase the widths of the edge portions 22 and 26, thus increasing the overall width w of the sensor without producing any effective increase in the surface area over which it responds to the applied force F. In FIGS. 1,2 and 3, the spacers 16, by being positioned at the roots of the fingers 24,28, provide support over a sufficient total surface area to hold the members 18,20 apart from the layer 14 without significantly affecting the ability of the fingers 24,28 to flex into contact with the layer 14 in response to the applied force.

In a modification, the conductive members 18,20 may be replaced by a conductive member or members of any other suitable shape. For example, the conductive members 18,20 could be replaced by a single continuous conductive layer or film extending over the area lw and separated from the layer 14 by separated spacers similar to the spacers 16 and either by its own resilience or by the resilience of the cover layer 12 (in the case where the conductive layer is formed on the layer 12).

Figure 4:
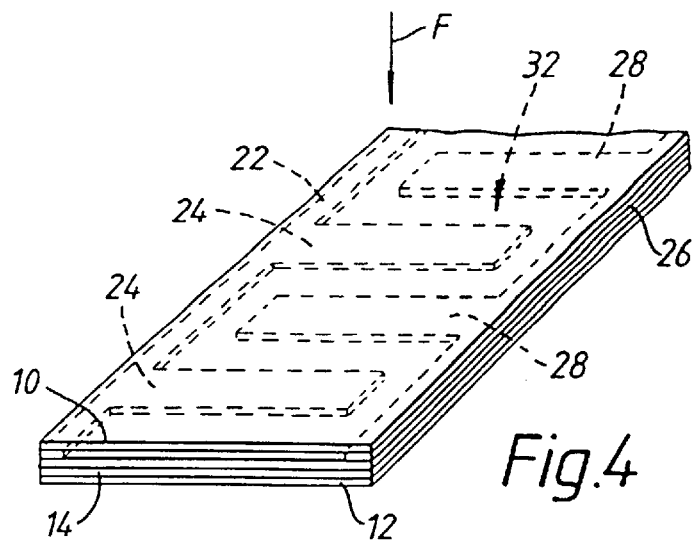
FIG. 4 is a perspective view of another of the sensors.
Figure 5:
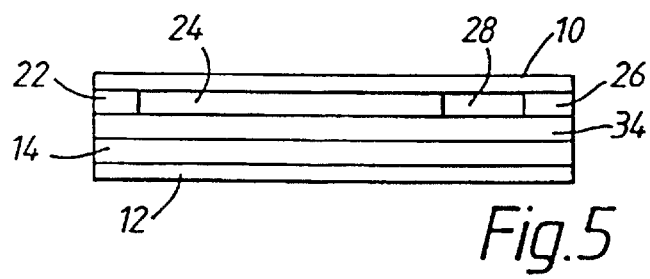
FIG. 5 is a perspective view of an electrically insulating spacer used in the sensor of FIG. 4.
Figure 6:
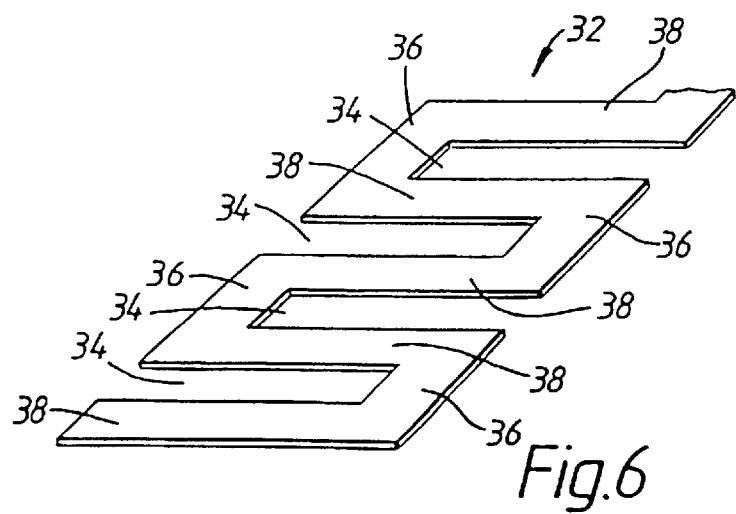
FIG. 6 is an enlarged end view of the sensor of FIG. 4.

Items in FIGS. 4,5 and 6 which are similar to items in FIGS. 1,2 and 3 are similarly referenced.

In the embodiment of FIGS. 4,5 and 6, the individual spacers 16 of the embodiment of FIGS. 1,2 and 3 are replaced by a a rigid mounting channel 46 supported by inner and outer frame members 48 and 49. The mounting channel 46 supports a window sealing and guiding channel 50. The window channel 50 may be made of extruded or moulded flexible material such as rubber or plastics material. The distal edges of the side walls of the channel have outwardly directed lips 52 and 54 which extend over the corresponding edges of the mounting channel 46. Near the base of the channel 50, it has further outwardly directed lips 56 and 58 which engage the curved-over edge regions of the frame members 48 and 49 and resiliently hold the channel 50 within the mounting channel 46.

Figure 9:
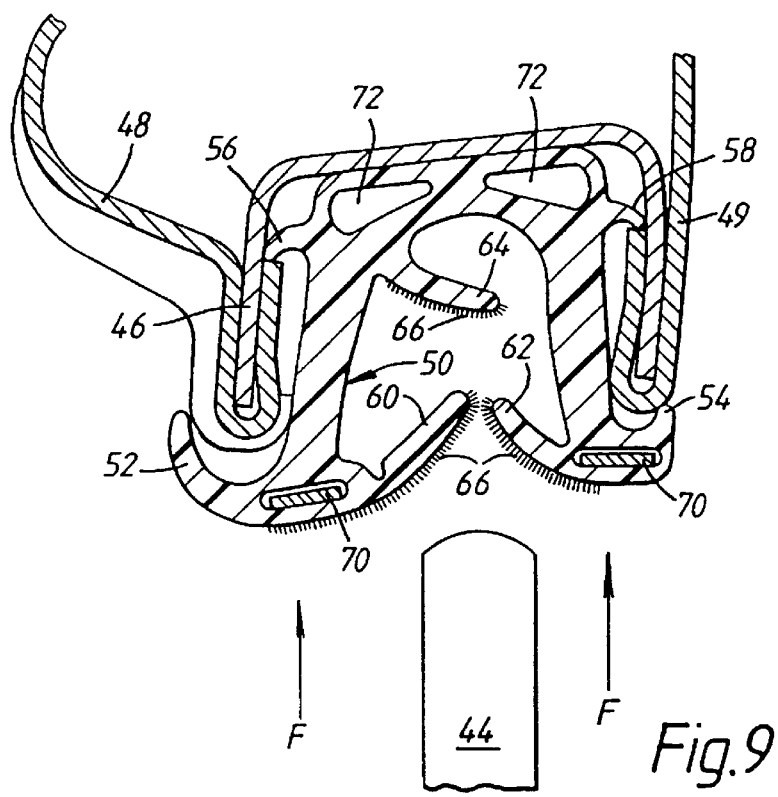
FIG. 9 is a section on the line IX of FIG. 8.

The channel 50 also has lips 60 and 62 which extend across the mouth of the channel and a further inner lip 64 near the base of the channel. FIG. 9 shows the window glass 44 which, as it rises to the closed position, enters the channel 50 with the outer surfaces of the lips 60 and 62 bearing against its opposite faces and the lip 64 bearing against the edge of the glass. The surfaces of the lips 60,62,64 which make contact with the glass 44 may be covered with a layer of flock 66 or other similar material.

Within the distal edge of each side wall of the channel 50, a force-responsive sensor 70 is embedded so as to run longitudinally along the length of at least part of the channel sensitivity of the sensor to the applied force F.

The sensors described above can be designed not only to respond to a force applied to the uppermost surface shown in the Figures but also to a force applied to the undersurface. This can be achieved by making the layers 12 and 14 resiliently flexible.

The sensors shown in FIGS. 1 to 7 can be used in many applications where it is required to produce an electrical signal in response to an applied force. One particular application will now be described, by way of example only, and relates to the detection of an obstruction in a window opening in a motor vehicle body which is closable by a motorised window glass. In such cases, it is desirable to be able to detect the presence of such an obstruction (e.g. part of the human body) so as to cause immediate stopping of the window glass and avoiding consequent injury.

Figure 8:
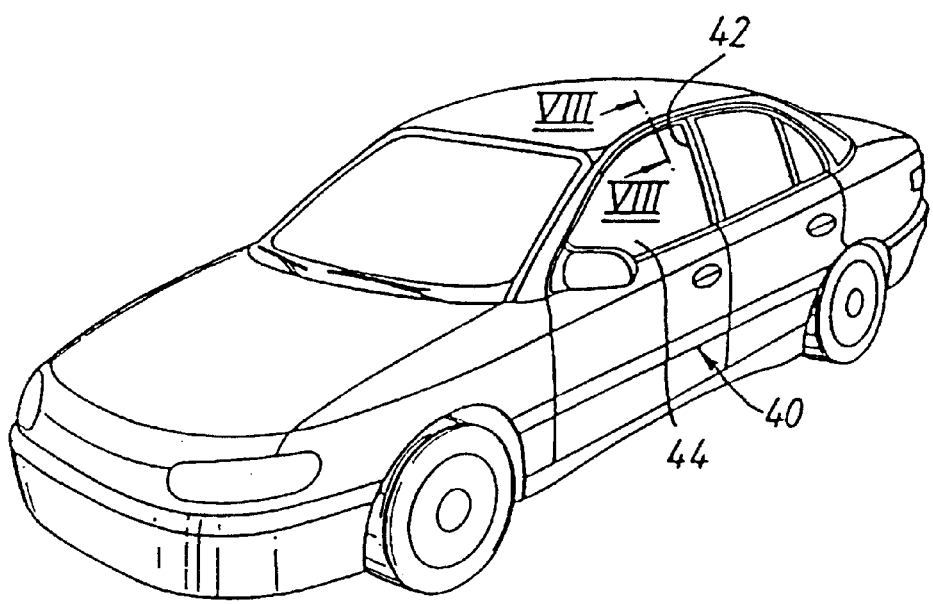
FIG. 8 is a perspective view of a motor vehicle.

As shown in FIG. 8, a motor vehicle has a door 40 supporting a window frame 42 in which a window glass 44 is upwardly and downwardly slidable. The window glass 44 is raised and lowered by means of an electric motor operable under control of an occupant of the vehicle.

FIG. 9 shows a section through the window frame 42, comprising to the length of the sensor. In this embodiment, the members 18,20 are replaced by a single continuous flexible conductive layer or film 18A extending over substantially the whole of the area lw. In the same manner as previously described, the spacers 39, in combination with the resilience of the cover layer 10, ensure that there is no normal contact between the members 18A and the conductive layer 14. In response to an applied force F, however, and as explained in connection with the previous embodiments, the cover layer 10 flexes and the conductive layer 18A over one or more of the gaps between the spacers 39 is pressed into contact with the conductive layer 14 so as to produce a detectable electrical signal.

The spacers 39 can be of any suitable cross-section so as to provide electrically insulating separation between the member 18A and the layer 14. The spacers 39 can be formed on the layer 14 by a normal printed-circuit technique. Instead, however, they could be formed separately.

Advantageously, the angle can be varied to alter the sensitivity of the sensor without increasing the overall width of the sensor. Additionally, the width of the spacers 80 can be varied with the same result. Thus, increasing the angle and/or increasing the width of the spacers 39 will decrease the The spacer 32 can be of any suitable shape so as to provide electrically insulating separation between the members 18 and 20 and the layer 14, the support which it provides extending at least partially across the width of the sensor and being shaped so that the support is sufficient without increasing the overall width of the sensor and without reducing its sensitivity to an applied force F. The spacer 32 can be formed on the conductive layer 14 by a normal printed-circuit technique. Instead, however, it could be a separate sheet.

As explained above in connection with FIGS. 1 to 3, the conductive layers 18,20 could be replaced by one or more conductive members of any suitable shape so as to have conductive portions extending over the gaps in the spacer 32 and supported thereover either by their inherent resilience or by the resilience of the cover layer 12 in the case where the conductive portions are formed as films on the layer 12.

Figure 7:
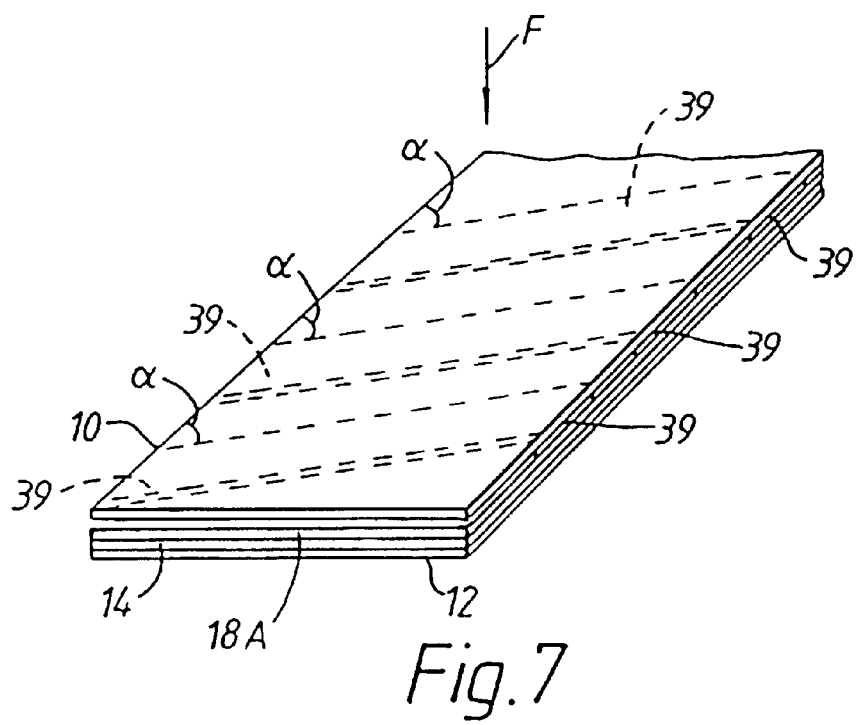
FIG. 7 is a perspective view of a further one of the sensors.

Items in FIG. 7 which are similar to items in FIGS. 1 to 6 are similarly referenced.

In the embodiment of FIG. 7, the individual spacers 16 of FIGS. 1 to 3 and the spacer 32 of FIGS. 4 to 6 are replaced by a series of insulating spacers 39 extending widthwise of the sensor at intervals therealong, each spacer being at an angle continuous single spacer 32 which is of zig-zag form to define gaps 34 extending widthwise of the sensor and at positions coinciding with the fingers 24 and 28. As before, the fingers 24,28 and the remaining parts of the members 18,20 are formed as films on the underside of the insulating cover layer 10. The portions 36 of the spacer 32 which run in a longitudinal direction of the sensor are positioned between the conductive layer 14 on the one hand and the edge portions 22,26 of the conductive members 18 and 20 on the other hand. The portions 38 of the spacer 32 which run in the transverse direction support the cover layer 10 between the fingers 24,28 and thus indirectly help to support the members 18,20 and maintain their separation from the conductive layer 14. The conductive members 18 and 20 are thus electrically insulated by the spacer 32 from the conductive layer 14. In response to an applied force F, however, and as explained in connection with FIGS. 1,2 and 3, the cover layer 10 flexes and one or more of the fingers 24,28 is pressed into contact with the conductive layer 14 so as to produce a detectable electrical signal.

Again, therefore, the conductive layer 32 electrically insulates the conductive members 18 and 20 from the conductive layer 14 without increasing the overall width of the sensor. This is achieved by virtue of the additional support provided to the cover layer 10 by the portions 38 of the spacer 32. 50; advantageously, the sensors run along that part of the channel 50 which extends along the top of the window opening and down the "A" pillar of the vehicle to the region of the rear view mirror. Advantageously, each sensor 70 has the form shown in FIGS. 1,2 and 3, in FIGS. 4,5 and 6, or in FIG. 7.

If an obstruction, such as part of the human body, is placed in the window opening when the window glass 44 is wholly or partially open, it will be carried upwardly by the closing window glass and will cause a force F (see FIG. 9) to be applied to the distal edges of either or both of the side walls of the channel 50, this force then being transmitted by the material of the channel to the corresponding sensor. As explained in conjunction with the earlier Figures, therefore, one or more of the fingers 24 and/or 28 of the conductive members 18,20 (or the conductive layer 18A in the case of the embodiment of FIG. 7 will be moved into electrical contact with the conductive layer 14, thus producing an electrically detectable control signal. This control signal can be used to cause immediate de-energisation of the motor which is raising the window glass, advantageously followed by reversal of the motor to lower it. Each sensor 70 is preferably mounted in the channel 50 so that the face shown uppermost in FIGS. 1,2 and 3, in FIGS. 4,5 and 6 or in FIG. 7 faces downwardly in FIG. 9. However, this is not essential because the sensors can be arranged to respond to a force applied to either of its major faces.

Figure 10:
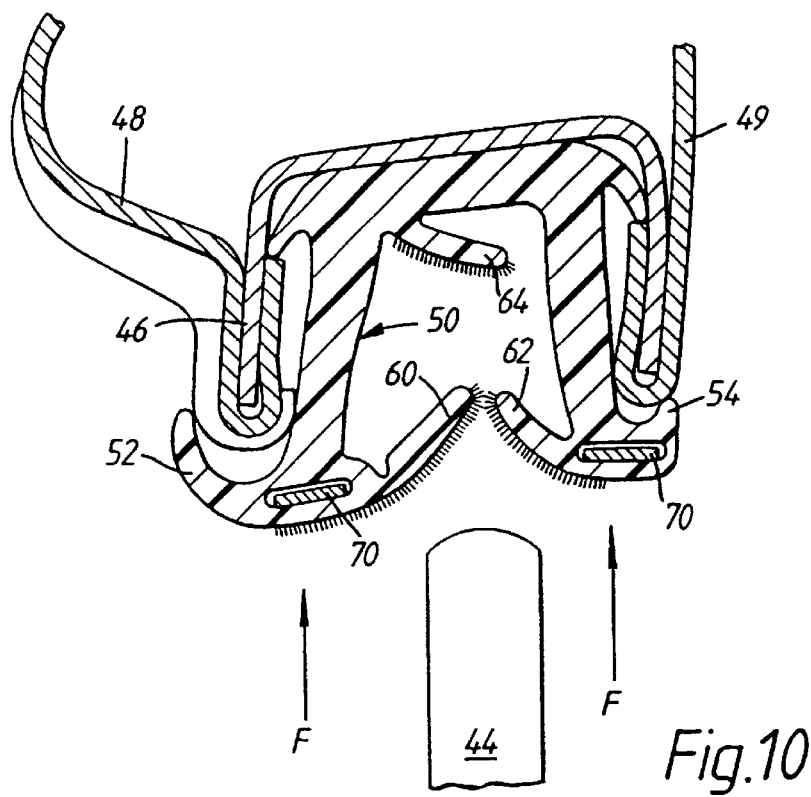
FIG. 10 is a view corresponding to FIG. 9 but showing a modified construction.

As shown in FIG. 9, the base of the channel 50 is provided with two longitudinally extending hollow chambers 72 to increase the resilience of the side walls of the channel. The additional resilience ensures that only a low reactive force is applied to the obstruction by the window glass during the very short period of time in which it may continue to rise after the sensor 70 has produced the control signal. Clearly, the resilience of the side wall must not be so great as to reduce the sensitivity of the sensors. FIG. 10 shows a modification in which the chambers 72 are omitted.

What is claimed is:

1. A force-responsive longitudinally extending sensor, comprising first longitudinally extending electrically conductive means in the form of a first electrically conductive layer of generally rectangular strip-like configuration having a predetermined width, second longitudinally extending electrically conductive means in the form of a second electrically conductive layer of generally rectangular strip-like configuration having a width matching the width of the first electrically conductive layer and extending at least partially along and aligned with the first electrically conductive layer, and electrically insulating means positioned between, and spacing the first electrically conductive layer from, longitudinally distributed parts of the second electrically conductive layer, the electrically insulating means comprising a plurality of discrete insulating means spaced apart from each other along the longitudinal direction of the sensor with gaps between them and co-extensive with the longitudinally distributed parts of the second electrically conductive layer, each of the discrete insulating means being positioned at an oblique angle to the longitudinal direction of the sensor and each extending across the whole of the width of the layers, areas of the first electrically conductive layer and of the second electrically conductive layer facing each other across said gaps normally being resiliently held spaced apart from each other but being able to be flexed into contact with each other in response to an applied force, the discrete insulating means being applied by a printed circuit technique.

2. A sensor according to claim 1, in which at least the first of the electrically conductive layers is formed on a flexible resilient layer, said areas of the first and second electrically conductive layers being held from each other by the resilience of the flexible layer until the layer is flexed towards the second electrically conductive layer by the applied force.

3. A safety system for detecting an obstruction in a framed opening closable by a motor-driven slidable closure member, comprising a sensor according to claim 1 mounted on or adjacent the frame of the opening and so positioned that said force is applied thereto when an obstruction within the opening is carried towards the frame by the sliding closable member, and control means responsive to contact between the first electrically conductive layer and the second electrically conductive layer to arrest motor-driven movement of the closable member.

4. A system according to claim 3, including a flexible guiding and sealing channel mounted on the frame for receiving an edge of the closure member which enters the mouth of the channel defined between parallel longitudinally extending distal edges of the side walls of the channel, the sensor being mounted on the channel to run longitudinally along or immediately adjacent to one of the distal edges.

5. A system according to claim 4, including another, similar, sensor, correspondingly mounted in or immediately adjacent to the other distal edge.

6. A system according to claim 4, in which the sensor is embedded within the material of the channel immediately adjacent the respective distal edge.

7. A system according to claim 4, in which the guiding and sealing channel defines a base and two channel side walls, the base has an outside surface which is mounted on rigid mounting means forming part of the frame, and the material forming the base of the guiding and sealing channel defines hollow chamber means positioned substantially at the junction of the base and each channel side wall.

8. A system according to claim 3, in which the framed opening is a window opening and the closure member is a pane of window glass.

9. A system according to claim 8, in which the window opening is a window opening a motor vehicle.

* * * * *